United States Patent
Yeh

(10) Patent No.: US 8,104,652 B2
(45) Date of Patent: Jan. 31, 2012

(54) ACCESSORY CONNECTING MEANS FOR BICYCLE SADDLE

(75) Inventor: Ping-Hsiang Yeh, Taichung (TW)

(73) Assignee: Velo Enterprise Co., Ltd., Taichung County (TW)

( * ) Notice: Subject to any disclaimer, the term of this patent is extended or adjusted under 35 U.S.C. 154(b) by 888 days.

(21) Appl. No.: 12/144,825

(22) Filed: Jun. 24, 2008

(65) Prior Publication Data

US 2009/0193632 A1 Aug. 6, 2009

(30) Foreign Application Priority Data

Jan. 31, 2008 (TW) .............................. 97103794 A

(51) Int. Cl.
*B62J 11/00* (2006.01)
*B62J 9/00* (2006.01)
(52) U.S. Cl. .......... 224/427; 24/616; 24/694; 280/288.4
(58) Field of Classification Search .................. 224/427; 24/573.11, 581.1, 573.09, 614, 615, 616, 24/682.1, 694; 280/288.4; 297/188.12, 188.18, 297/188.2

See application file for complete search history.

(56) References Cited

U.S. PATENT DOCUMENTS

| 4,144,794 | A | * | 3/1979 | Silverman et al. ............. 24/607 |
| 4,813,108 | A | * | 3/1989 | Geldwerth ..................... 24/616 |
| 5,190,345 | A | * | 3/1993 | Lin ............................ 297/188.12 |
| 5,459,910 | A | * | 10/1995 | Anscher ....................... 24/615 |
| 5,474,270 | A | * | 12/1995 | Rixen et al. .................. 224/427 |
| 5,593,126 | A | | 1/1997 | Muderlak |
| 6,438,808 | B1 | * | 8/2002 | Kung ........................ 24/573.09 |
| 6,622,355 | B2 | * | 9/2003 | Buscart et al. ................. 24/615 |
| 6,953,135 | B2 | * | 10/2005 | Litton et al. .................. 224/427 |
| 7,077,372 | B2 | * | 7/2006 | Moran ...................... 248/222.11 |

FOREIGN PATENT DOCUMENTS

WO WO 2007/034422 A1 * 3/2007

* cited by examiner

*Primary Examiner* — Gary Elkins
(74) *Attorney, Agent, or Firm* — Browdy and Neimark, PLLC

(57) ABSTRACT

An accessory connecting means for a bicycle saddle includes a first connecting member, a second connecting member and a latching apparatus. The first connecting member includes a fixing portion for fixation to the bicycle saddle, and a first engaging portion extending downward from a lower side of the fixing portion. The second connecting member includes a coupling portion removably coupled with the accessory, and a second engaging portion extending upwardly from an upper side of the coupling portion to releasably engage with the first engaging portion. The latching apparatus is disposed between the first and second engaging portions in such a way that the first and second engaging portions can be interlocked with each other at the time of engagement and quickly released from each other at the time of disengagement.

5 Claims, 5 Drawing Sheets

ACCESSORY CONNECTING MEANS FOR BICYCLE SADDLE

BACKGROUND OF THE INVENTION

1. Field of the Invention

The present invention relates generally to bicycle saddles, more particularly, to a connecting means for connecting containers or accessories to a bicycle saddle.

2. Description of the Related Art

When riding a bicycle, it is necessary to have equipment to carry emergency tool and accessories to be used in case of mechanical breakdowns. Special containers or tool kits have been designed to this purpose and a number of technical arrangements have been developed to solve the problem of carrying such containers.

U.S. Pat. No. 5,593,126 discloses a quick-connect structure for a bicycle saddle that allows an easy and safe connection of accessories to the bicycle saddle. The quick-connect structure has one male member that may be snap-fitted in a corresponding female member. The male and female members are separately associated to the saddle and an object for attachment to the saddle. The primary drawback of the structure is that the accessory coupled thereto may loosen or fail with time because the direction of the external force to release the male member from the female member is the same as that of the force that gravity applies to the accessory.

SUMMARY OF THE INVENTION

The primary objective of this invention is to overcome the above drawback by providing an improved accessory connecting means which allows an easy, quick and safe connection of accessories to a bicycle saddle.

To achieve the objective, an accessory connecting means for a bicycle saddle according to the present invention comprises a first connecting member, a second connecting member and a latching apparatus.

The first connecting member is fixed to a bicycle saddle and can releasably engage with the second connecting member which is coupled with an accessory. In one embodiment, the first connecting member includes a fixing portion, and a first engaging portion. The fixing portion has an upper side to be fixed to the bicycle saddle. The first engaging portion extends downward from a lower side of the fixing portion.

The second connecting member includes a coupling portion and a second engaging portion. The coupling portion has a lower side to removably be coupled with the accessory. The second engaging portion extends upwardly from an upper side of the coupling portion to releasably engage with the first engaging portion of the first connecting member.

The latching apparatus is disposed between the first and second engaging portions in such a way that the first and second engaging portions can be interlocked with each other at the time of engagement and quickly released from each other at the time of disengagement.

BRIEF DESCRIPTION OF THE DRAWINGS

The invention will now be more particularly described, by way of example only, with reference to the accompanying drawings, in which.

DETAILED DESCRIPTION OF THE INVENTION

Figure 1:
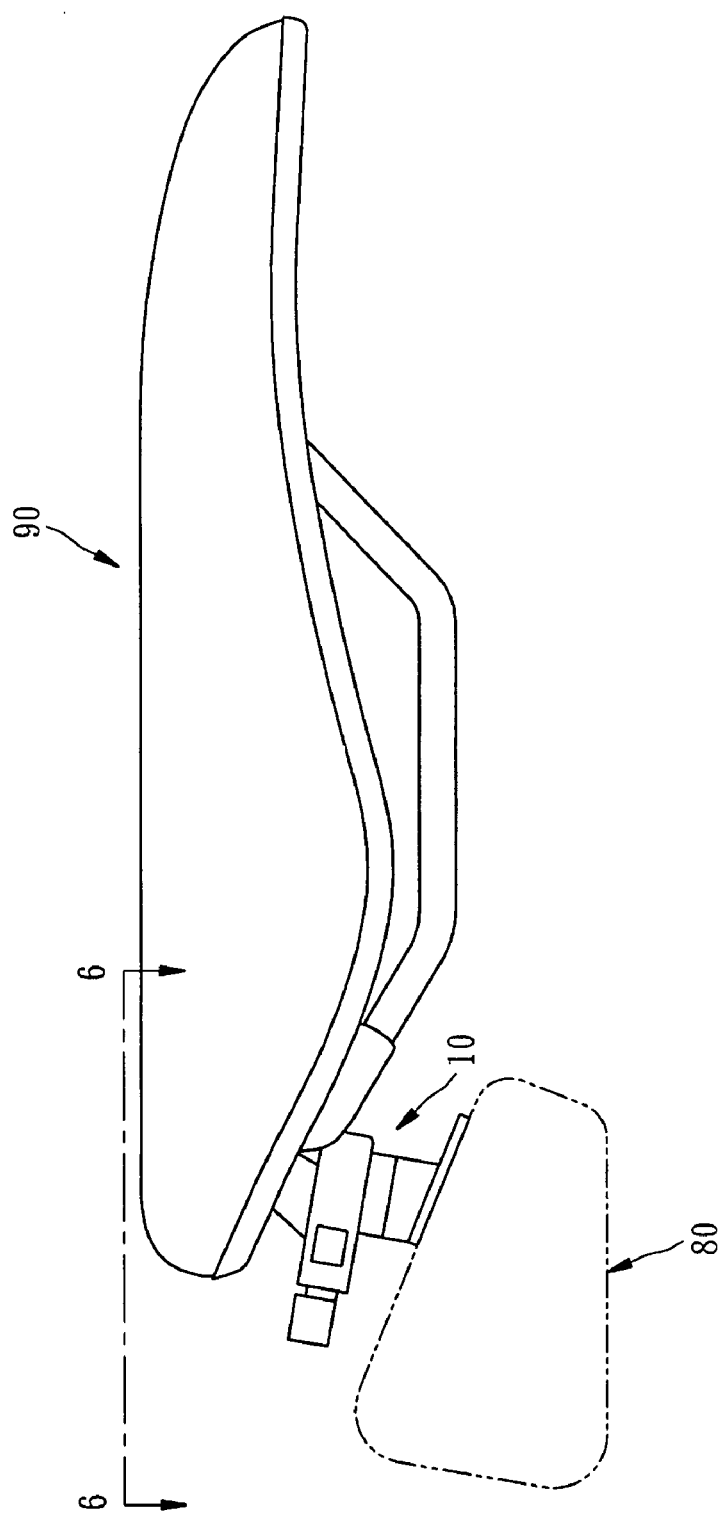
FIG. 1 is a side view of a bicycle saddle, one embodiment of the connecting means according to the invention, and an accessory connected to the bicycle saddle by the connecting means.

Referring to FIG. 1 through FIG. 6, an accessory connecting means constructed in accordance with the present invention is generally designated as numeral 10. The connecting means 10 is suitable for removably connecting an accessory 80, such as a tool kit, a mudguard, a reflector, a water bottle cage, or the like, to a bicycle saddle 90, as shown in FIG. 1.

Figure 2:
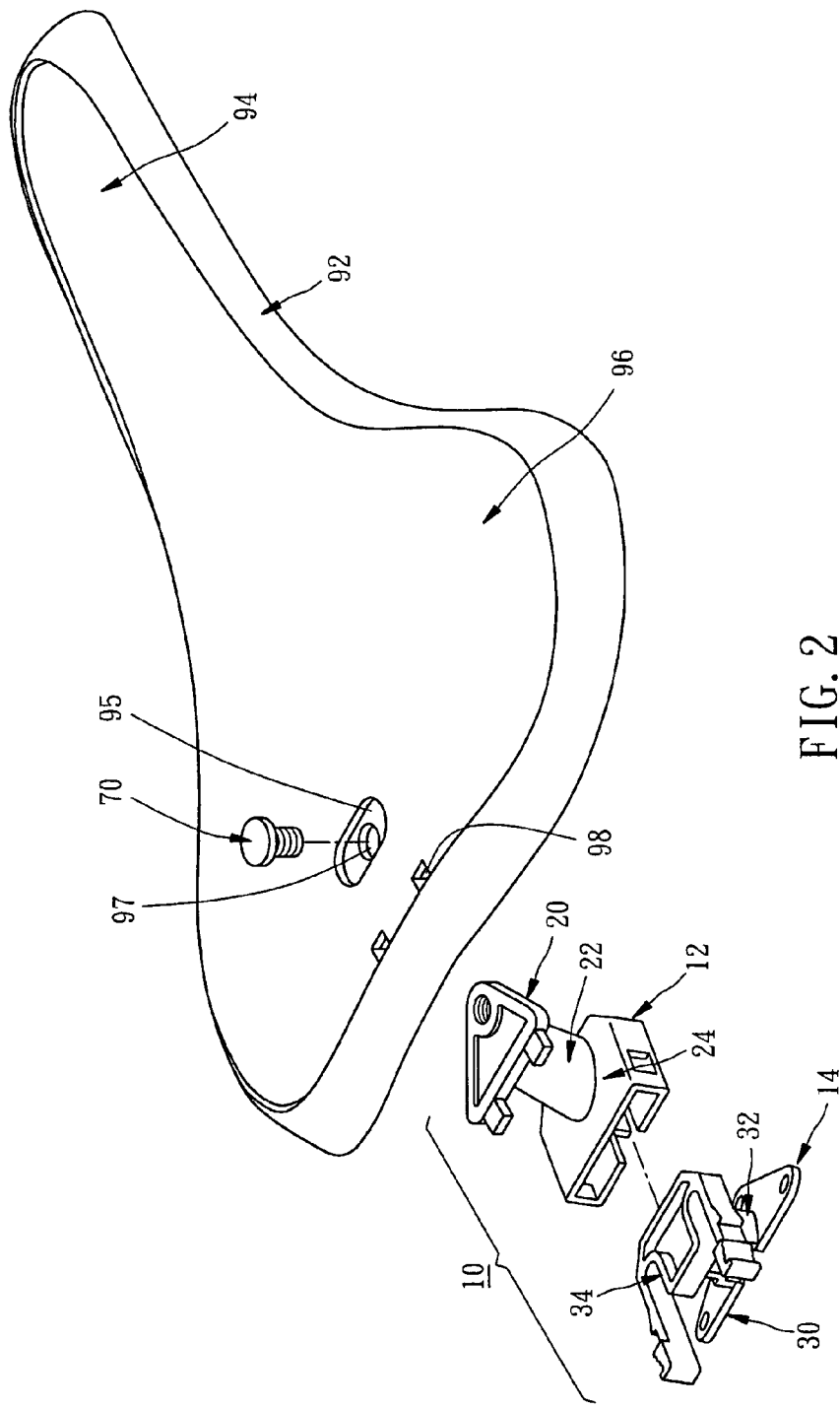
FIG. 2 is an exploded view of the connecting means of FIG. 1 and a body frame of the bicycle saddle.
Figure 3:
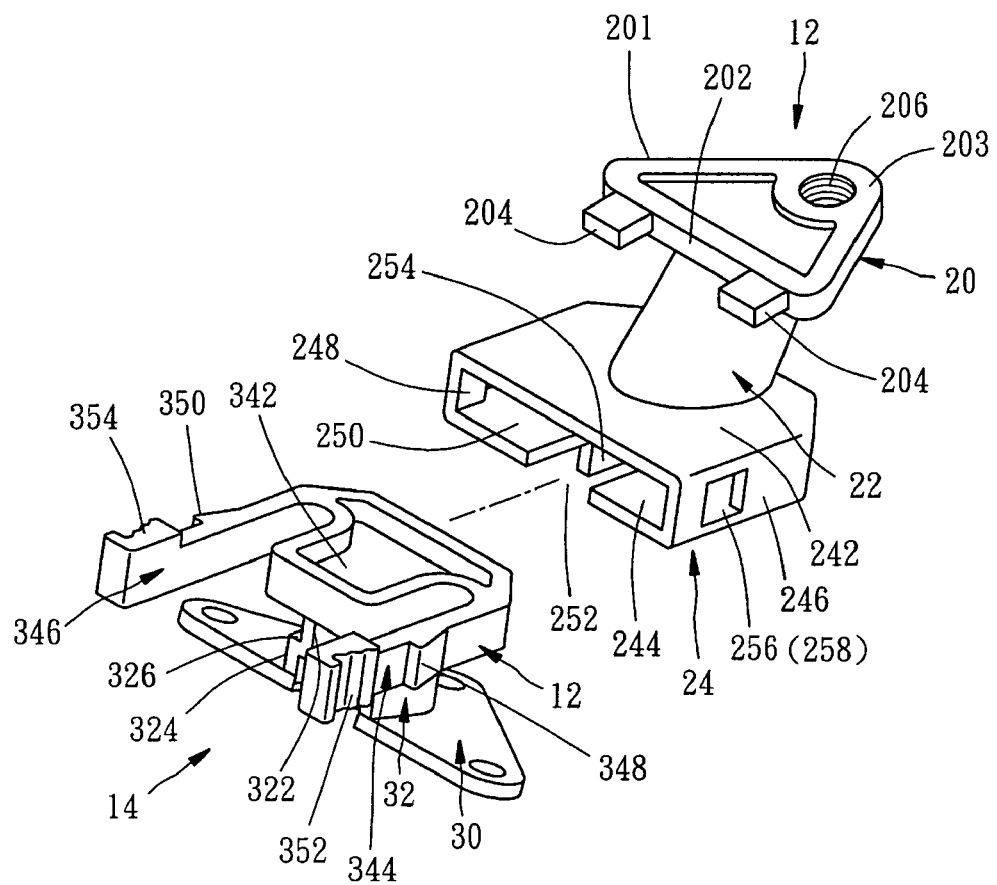
FIG. 3 is a perspective view of the connecting means of FIG. 1 from a first side wherein the first and second connecting members are separated.
Figure 4:
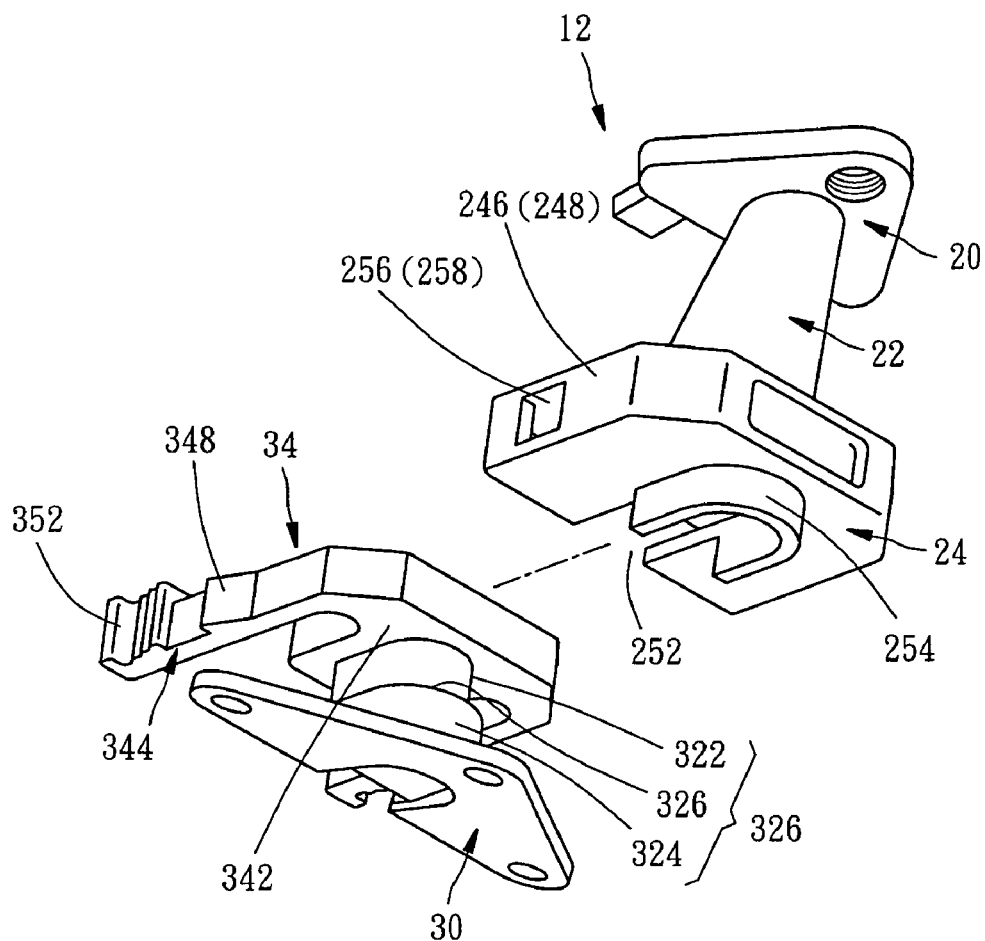
FIG. 4 is a perspective view of the connecting means of FIG. 1 from a second side wherein the first and second connecting members are separated.

The connecting means 10 includes a first connecting member 12 and a second connecting member 14. They can be plastic molded devices. The first connecting member 12 has a fixing portion 20, an extending post 22 and a first engaging portion 24. The second connecting member 14 has a coupling portion 30, a guiding portion 32 and a second engaging portion 34, as shown in FIG. 2.

The fixing portion 20 has a triangularly shaped board 201 with a pair of projections 204 extending from a side 202 thereof and a threaded hole 206 disposed on a vertex 203 of the board 201 opposite the side 202. The bicycle saddle 90, as shown in FIG. 2, includes a body frame 92 having a narrow front end 94 and a wide rear end 96. The wide rear end 96 of the frame 92 has a recess 95 with a through hole 97 and a pair of open nests 98.

When assembling, each of the projections 204 of the board 201 is inserted into one of the open nests 98 of the frame 92, and then a bolt 70 passes through the hole 97 and engages with the threaded hole 206 of the board 201 so that the first connecting member 12 is fixed to the frame 92 of the bicycle saddle 90.

The extending post 22 of the first connecting member 12 extends downward a predetermined length from the under surface of the fixing portion 20 and connects with the first engaging portion 24. The first engaging portion 24 includes a top wall 242 connected to the free end of the post 22, a bottom wall 244 and a pair of opposing side walls 246, 248 connecting the top and bottom walls 242, 244. The side walls 246, 248 and the top and bottom walls 242, 244 define a chamber 250 therebetween which is open at an open end thereof. The bottom wall 244 has an open guiding channel 252 and a stopping wall 254 formed on the rear end of the channel 252. Each of the side walls 246, 248 has an aperture 256, 258.

The coupling portion 30 of the second connecting member 14 is a triangularly shaped board coupled with the accessory 80. The guiding portion 32 extends upwardly a predetermined length from the upper surface of the coupling portion 30. The guiding portion 32 has an upper area 322, a lower area 324 and a step area 326 formed therebetween. The second engaging portion 34 includes a base 342 connected to the free end of the guiding portion 32, a pair of resiliently flexible arms 344, 346 extending along opposite sides of the base 342. Each of the arms 344, 346 has a latching protrusion 348, 350 and a pressing end 352, 354.

Figure 5:
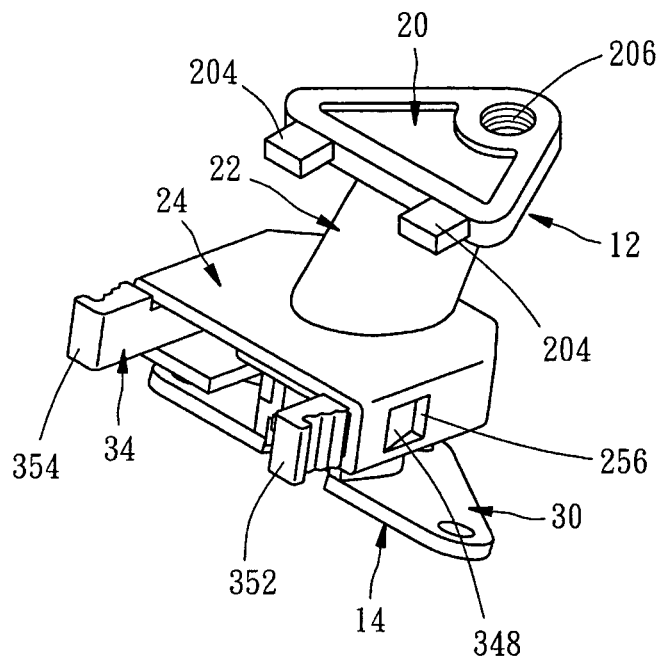
FIG. 5 is a perspective view of the connecting means of FIG. 1 from the first side wherein the first and second connecting members are connected.
Figure 6:
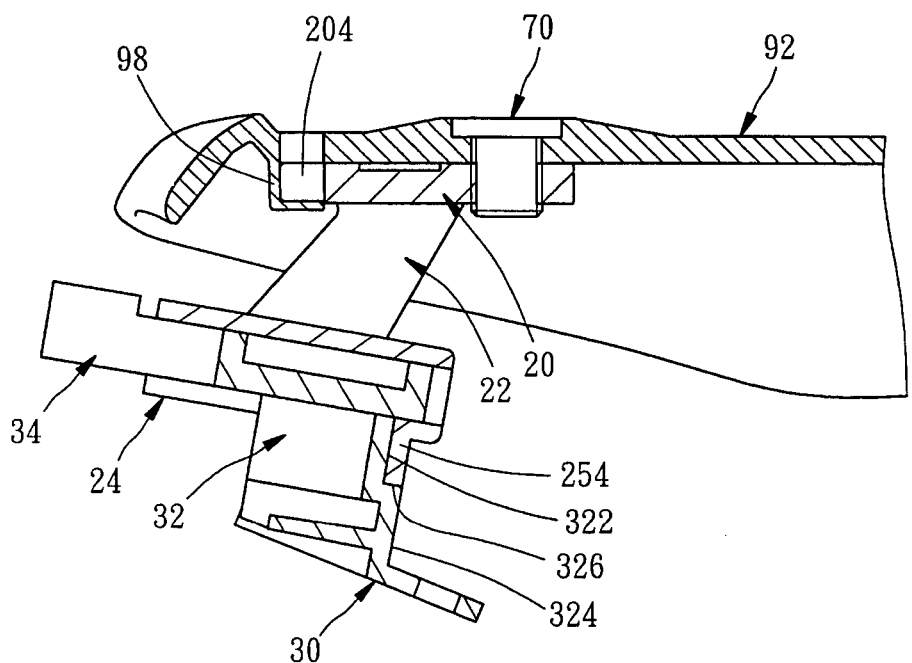
FIG. 6 is a partial sectional side view, taken along line 6-6 of FIG. 1, of the connecting means of FIG. 1.

To releasably connect the accessory 80 to the bicycle saddle 90, the pressing ends 352, 354 of the arms 344, 346 are first pressed inward toward the base 342 so that the second engaging portion 34 is inserted within the chamber 250 of the first engaging portion 24 by the guide of the guiding portion 32 passing through the channel 252. Further insertion of the second engaging portion 34 will result in the latching protrusion 348, 350 moving into the apertures 256, 258, at which point each arm 344, 346 snaps outward with respect to the chamber 250. In this position, each latching protrusion 348, 350 extends out respectively from the side walls 246, 248 of the first engaging portion 24 through each of apertures 256, 258 so that the first engaging portion 24 and the second engaging portion 34 are interlocked with each other, as shown in FIG. 5.

To release the accessory 80 from the bicycle saddle 90, a user exerts inward force against the pressing ends 352, 354 to flex the arms 344, 346 inward with respect to the chamber 250 to clear the latching protrusions 348, 350 from the apertures 256, 258. Once the latching protrusions 348, 350 move away from the apertures 256, 258, the second engaging portion 34 can be removed from the first engaging portion 24.

What is claimed is:

1. An accessory connecting means for a bicycle saddle, comprising:
    a first connecting member including a fixing portion and a first engaging portion, said fixing portion having an upper side to be removably fixed to a bicycle saddle, said first engaging portion extending from a lower side of said fixing portion;
    a second connecting member including a coupling portion and a second engaging portion, said coupling portion having a lower side to be removably coupled with an accessory, said second engaging portion extending from an upper side of said coupling portion to removably engage with said first engaging portion of said first connecting member; and
    a latching apparatus disposed between said first and second engaging portions in such a way that said first and second engaging portions can be interlocked with each other at the time of engagement and quickly released from each other at the time of disengagement;
    wherein said first connecting member further includes an extending portion disposed between said fixing portion and said first engaging portion;
    wherein said fixing portion is a board having an upper side to be fixed to a bicycle saddle;
    wherein said extending portion is a post extending from a lower side of said board;
    wherein said first engaging portion comprises a top wall connecting to an end of said post, a bottom wall and a pair of opposing side walls connecting the top and bottom walls, said side walls and said top and bottom walls defining a chamber therebetween which is open at an open end thereof;
    wherein said second engaging portion includes a base, a pair of resiliently flexible arms extending along opposite sides of said base for insertion within said chamber of said first engaging portion through said open end of said chamber; and
    wherein said second connecting member further includes a guiding portion disposed between said coupling portion and said second engaging portion.

2. The connecting means as claimed in claim 1, wherein said coupling portion is a board having a lower side to be coupled with an accessory.

3. The connecting means as claimed in claim 2, wherein said guiding portion has an upper area, a lower area and a step area formed therebetween.

4. The connecting means as claimed in claim 3, wherein said bottom wall of said chamber has a guiding channel so as to guide said guiding portion of said second engaging portion to be inserted into said chamber of said first engaging portion.

5. The connecting means as claimed in claim 1, wherein said latching apparatus includes a pair of latching protrusions, each of which is disposed on one of said arms, and a pair of apertures, each of which is defined in one of said side walls of said chamber of said first engaging portion such that each of said protrusions is snapped into one of said apertures at the time of engagement.

* * * * *